United States Patent [19]

Kino et al.

[11] Patent Number: 5,859,814
[45] Date of Patent: Jan. 12, 1999

[54] MAGNETO-OPTIC RECORDING SYSTEM AND METHOD

[75] Inventors: Gordon S. Kino, Stanford, Calif.; David Dickensheets, Bozeman, Mont.; Pavel Neuzil, Singapore, Czechoslovakia

[73] Assignee: The Board of Trustees of the Leland Stanford Junior University

[21] Appl. No.: 921,144

[22] Filed: Aug. 29, 1997

Related U.S. Application Data

[60] Provisional application No. 60/028,660 Oct. 18, 1996.

[51] Int. Cl. [6] .................................................. G11B 11/00
[52] U.S. Cl. ........................ 369/13; 369/44.14; 369/112
[58] Field of Search ................................ 369/13, 14, 110, 369/112, 126, 116, 44.14, 44.23, 44.26, 44.24, 44.39; 360/114, 59

[56] References Cited

U.S. PATENT DOCUMENTS

| | | | |
|---|---|---|---|
| 4,581,529 | 4/1986 | Gordon | 250/227 |
| 4,679,180 | 7/1987 | Kryder et al. | 369/13 |
| 4,882,718 | 11/1989 | Kryder et al. | 369/13 |
| 4,888,750 | 12/1989 | Kryder et al. | 369/13 |
| 5,065,390 | 11/1991 | Miyauchi et al. | 369/110 |
| 5,184,335 | 2/1993 | Kryder et al. | 369/13 |
| 5,218,582 | 6/1993 | Marchant | 369/14 |
| 5,245,491 | 9/1993 | Horie et al. | 360/114 |
| 5,288,998 | 2/1994 | Betzig et al. | 250/227.26 |
| 5,343,460 | 8/1994 | Miyazaki et al. | 369/126 |
| 5,389,779 | 2/1995 | Betzig et al. | 250/216 |
| 5,400,306 | 3/1995 | Bell, Jr. | 369/13 |
| 5,635,977 | 6/1997 | Hirokane et al. | 347/256 |
| 5,689,480 | 11/1997 | Kino | 369/14 |
| 5,708,645 | 1/1998 | Sahara et al. | 369/112 |

FOREIGN PATENT DOCUMENTS

| | | |
|---|---|---|
| 0583112 | 2/1994 | European Pat. Off. . |
| 6-331805 | 12/1994 | Japan . |

OTHER PUBLICATIONS

Betzig, E., et al,; "Near–field magneto–optics and high density data storage", *Applied Physics Letters*, vol. 61, No. 2, Jul. 13, 1992, pp. 142–144.

Terris, B.D. et al.; "Near–field optical data storage using a solid immersion lens", *Applied Physics Letters*, vol. 65, No. 4, Jul. 25, 1994, pp. 388–390.

Pohl, D.W., et al,; "Near–field optics: Light for the world of NANO", *Journal of Vacuum Science and Technology*, Part B, vol. 12, No. 3, May 1, 1994, pp. 1441–1446.

Davis, R.C., et al.; "Micromachined submicrometer photodiode for scanning probe microscopy", *Applied Physics Letters*, vol. 66, No. 18, May 1, 1995, pp. 2309–2311.

*Primary Examiner*—Ali Neyzari
*Attorney, Agent, or Firm*—Flehr Hohbach Test Albritton & Herbert LLP

[57] ABSTRACT

A magneto-optic recording system employing near-field optics which includes a read/write head having a stylus comprising a pair of crossed tapered prisms made of a material having a high index of refraction closely adjacent to the recording medium to provide light coupling between slits at the ends of the prisms and the recording medium. The length of the prism slits being greater than one-half the effective wavelength inside the material filling the prism of the light transmitted by the prisms to transmit all light entering the waveguide to the tapered end and the width being a fraction of a wavelength of the light.

14 Claims, 6 Drawing Sheets

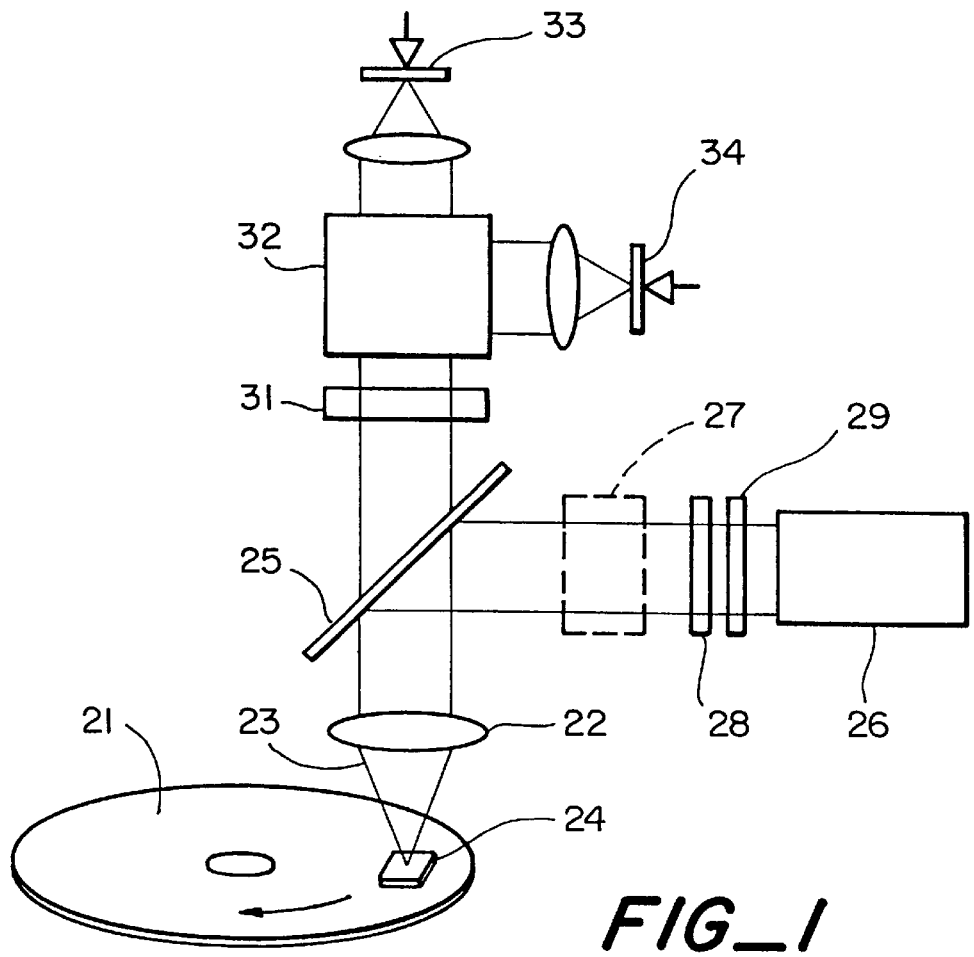
FIG_1
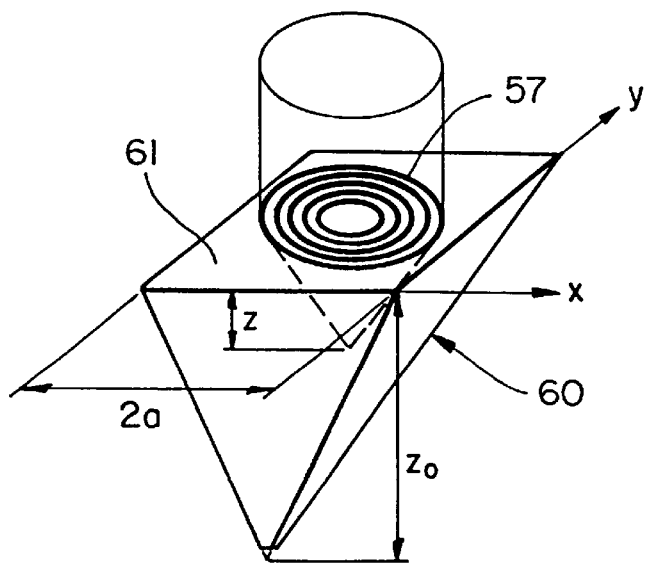
FIG_9

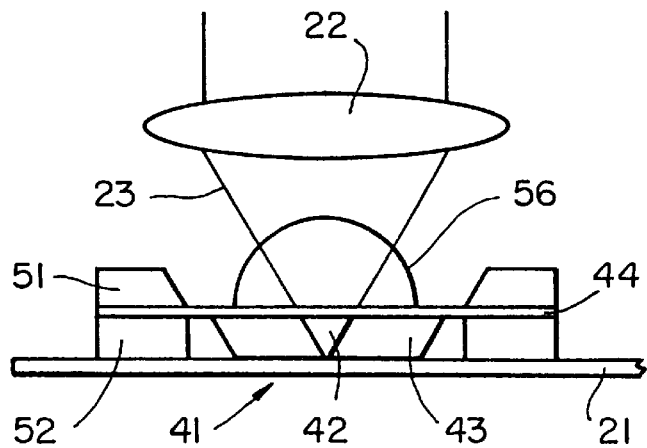
FIG_2
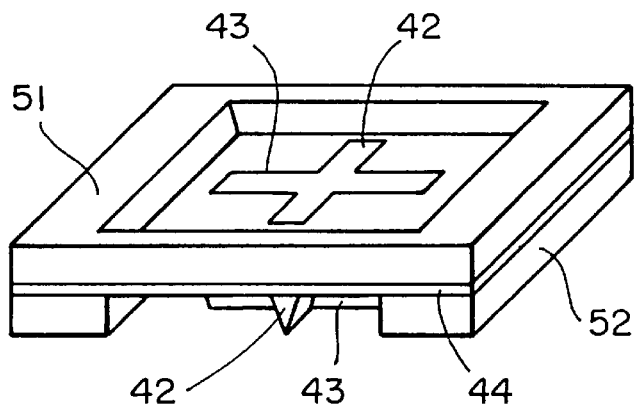
FIG_3
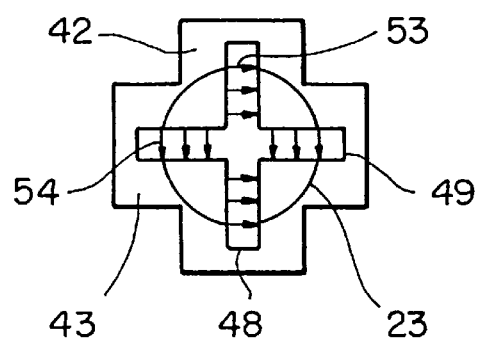
FIG_4

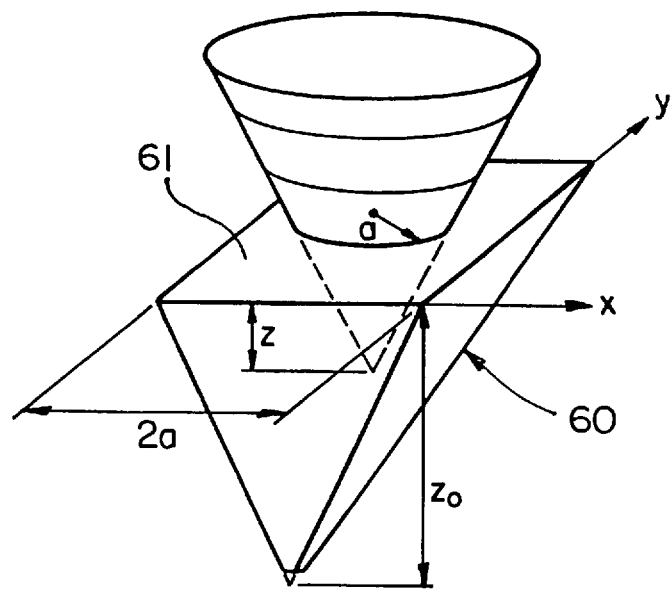
FIG_5
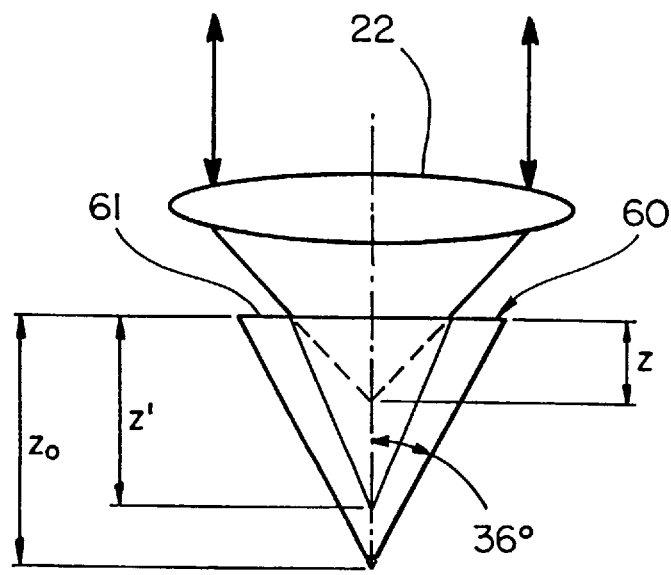
FIG_6

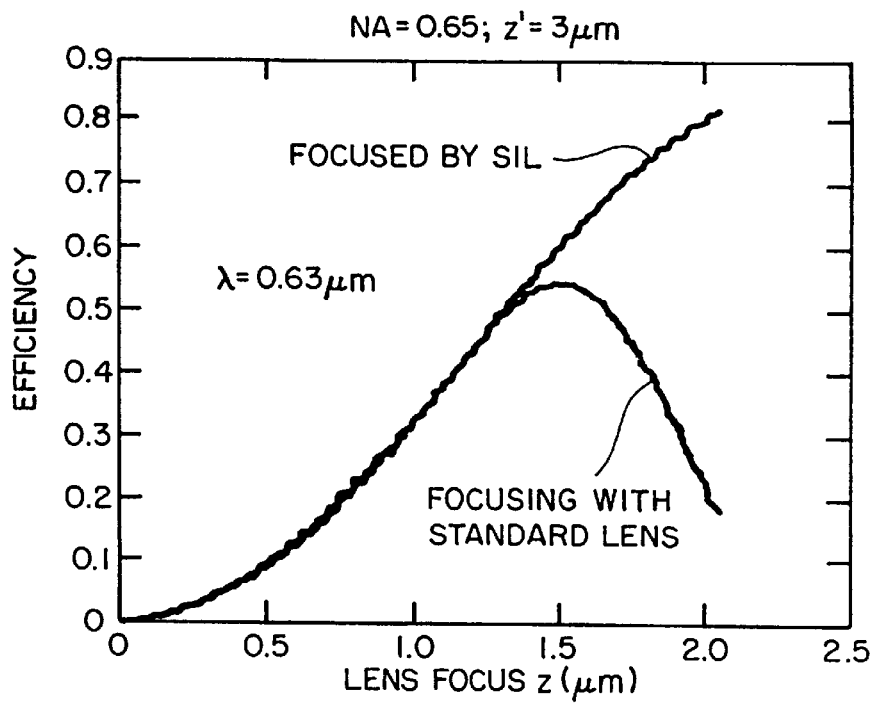
FIG_7
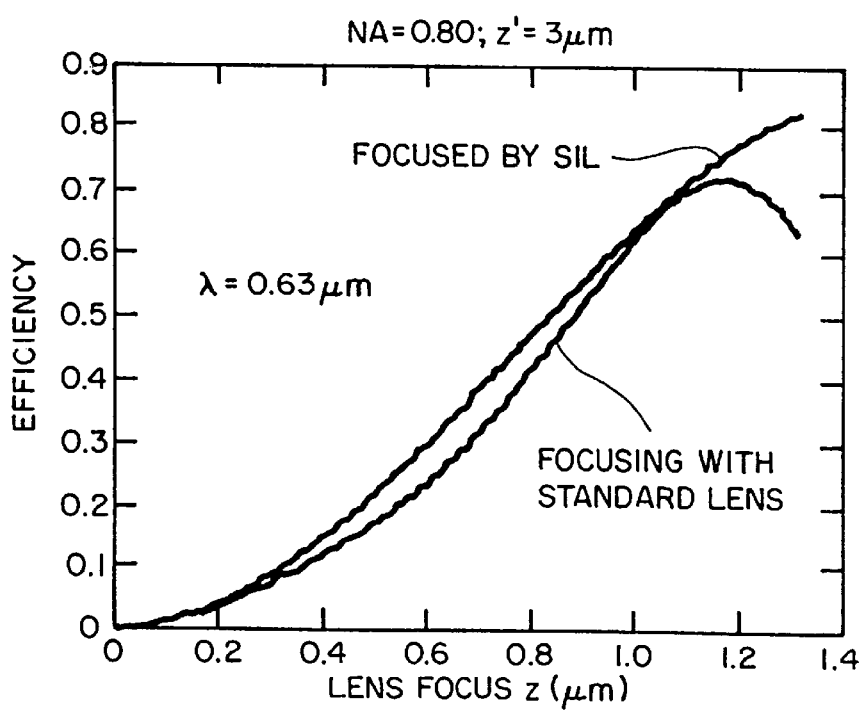
FIG_8

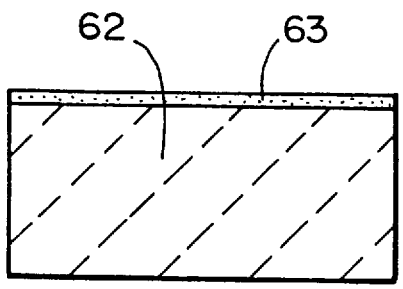
FIG_10A
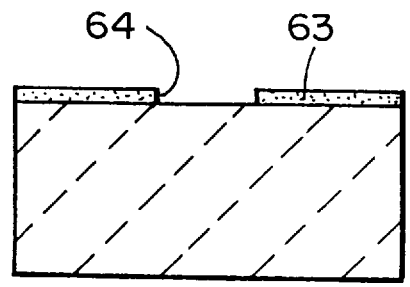
FIG_10B
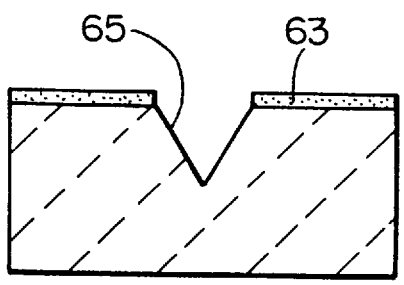
FIG_10C
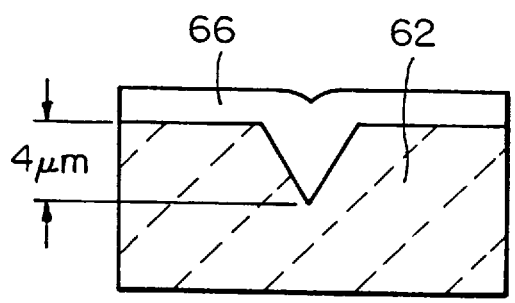
FIG_10D
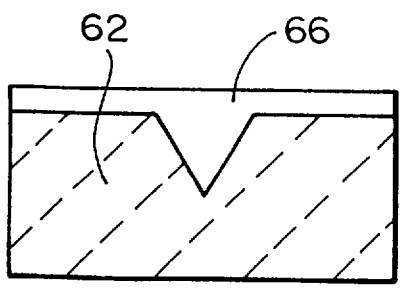
FIG_10E
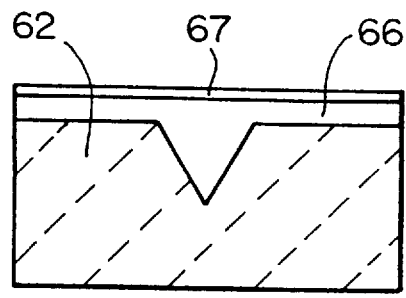
FIG_10F

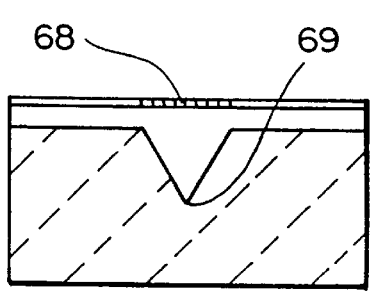
FIG_10G
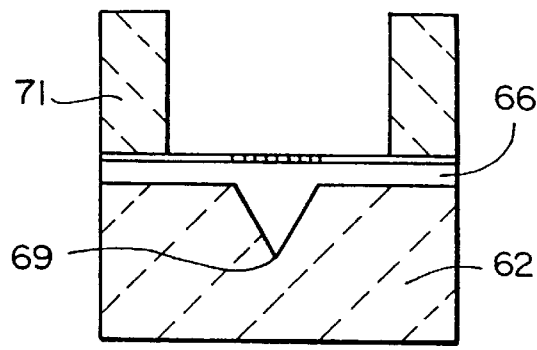
FIG_10H
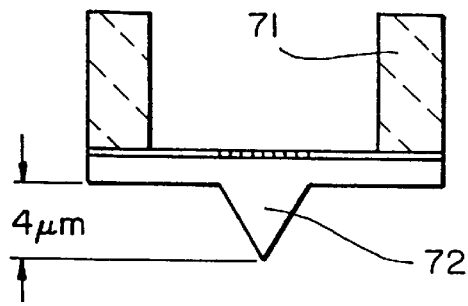
FIG_10I
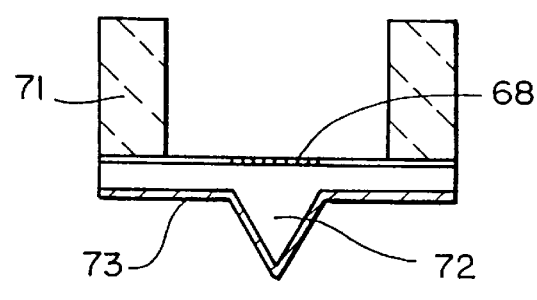
FIG_10J
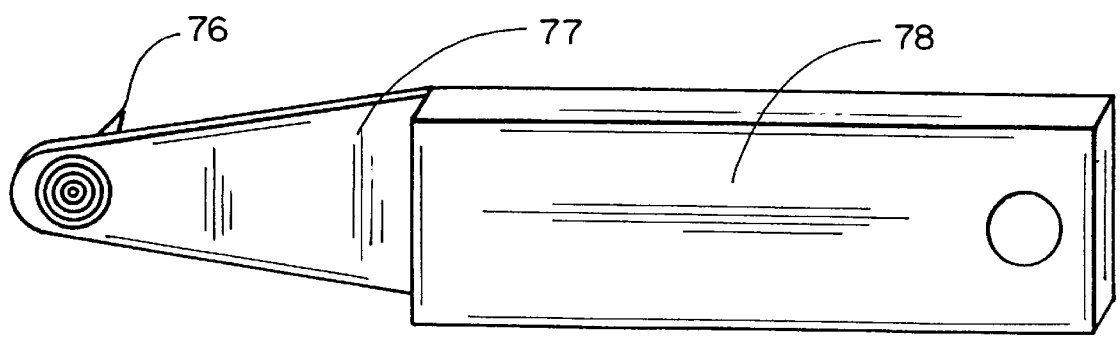
FIG_11

MAGNETO-OPTIC RECORDING SYSTEM AND METHOD

REFERENCE TO RELATED APPLICATION

This application claims the priority of U.S. provisional application Ser. No. 60/028,660 filed Oct. 18, 1996.

BRIEF DESCRIPTION OF THE INVENTION

The present invention relates generally to a magneto-optic recording system and more particularly to a read/write head assembly for a recording system which includes a stylus having crossed rectangular tapered prisms.

BACKGROUND OF THE INVENTION

In magneto-optic recording systems, digital information is stored in a thin magnetic storage medium by locally magnetized regions or domains. The regions are magnetized to represent either ones or zeros. The information is written into the magnetic storage medium by raising the temperature of localized small regions of the magnetic medium to the Curie point temperature of the medium at the localized regions. This lowers the coercivity to a point which enables orientation of the magnetic domain by an external magnetic field. The size of the regions or domains determine the density of the digital information. The size of the localized region is usually limited by diffraction and is marginally improved by use of shorter wavelengths of light and higher numerical aperture lens.

Stored information is read by Kerr or Faraday rotation of a polarized light beam incident on the magnetic medium by the magnetic fields at the magnetized regions or domains. The shift in polarization is in the order of one degree. This shift is employed to detect ones and zeros. Systems for reading out these small rotational changes are well established in the optical storage industry. Optical recording and the design of conventional read/write heads is described in the book entitled "Optical Recording" authored by Alan B. Marchant, Addison-Wesley Publishing, 1990.

In co-pending application Ser. No. 08/696,168 filed Aug. 13, 1996, incorporated herein in its entirety by reference, there is described a magneto-optic recording system employing near-field optics which includes a read/write head having a pair of crossed tapered optical waveguides terminating in slits supported closely adjacent to the recording medium to provide light coupling between the slit ends of the waveguides and the recording medium. The tapered waveguides are formed by etching a silicon wafer and filling the etched space with a transparent material. In one embodiment the tapered waveguides are filled with a material having a high index of refraction. The length of the waveguides and slits is greater than one-half the wavelength of the light transmitted by the waveguides wherein all light entering the waveguide is transmitted to the slits at the tapered end. The width of the slits at the tapered ends is a fraction of a wavelength of the light.

OBJECTS AND SUMMARY OF THE INVENTION

It is an object of the present invention to provide a magneto-optic recording system which includes a read/write head having a stylus comprising tapered prisms formed from material having a high index of refraction.

It is another object of the present invention to provide a stylus for an optical recording system having crossed tapered rectangular prisms.

It is a further object of the present invention to provide a stylus which can be easily and inexpensively fabricated using silicon processing techniques.

The foregoing and other objects of the invention are achieved by a read/write head assembly for reading or writing information onto an adjacent magnetic recording medium which includes a stylus comprising crossed tapered silicon nitride prisms which terminate in a slit having a length greater than one-half the wavelength of light in the silicone nitride material and a width substantially less than the wavelength of light in the silicon nitride material.

BRIEF DESCRIPTION OF THE DRAWINGS

The foregoing and other objects of the invention will be more clearly understood from the following description when read in conjunction with the following drawings.

FIG. 1 is a schematic diagram of a magneto-optical recording system employing a stylus having crossed prisms in accordance with the present invention.

FIG. 2 is a schematic cross-sectional view of a recording head assembly employing a stylus in accordance with the present invention.

FIG. 3 is an enlarged view of the stylus and support structure.

FIG. 4 is a plan view of the crossed slits at the tip of the tapered stylus prisms.

FIG. 5 is a perspective view of a stylus prism with a focus light beam impinging on the top surface.

FIG. 6 is a cross-sectional view of the prism of FIG. 5 showing the light beam focused within the prism.

FIG. 7 shows the excitation efficiency of the $TE_{10}$ mode of the prism of FIGS. 5 and 6 for a numerical aperture of 0.65 along with plots for perfect phase-matching as could be obtained with a solid immersion lens.

FIG. 8 shows the excitation efficiency of the $TE_{10}$ mode of the prism of FIGS. 5 and 6 for a numerical aperture of 0.8 along with plots for perfect phasematching as could be obtained with a solid immersion lens.

FIG. 9 is a perspective view of a stylus prism with a Fresnel lens focusing the light into the stylus prism.

FIGS. 10A–10J show the steps in forming prisms for a stylus in accordance with the present invention.

FIG. 11 shows a perspective view of a stylus with Fresnel lens mounted on a flexible support.

DESCRIPTION OF PREFERRED EMBODIMENT

A magneto-optic recording system employing an optical head with stylus in accordance with the present invention is schematically illustrated in FIG. 1. Data is recorded on and read from a magneto-optical disk 21. The disk may for example, have a magneto-optic film deposited on its front surface with a silicon nitride layer typically of the order of 50 nm thick laid down on top of the magnetic layer for protection and for optimizing the field distribution. Typically, the magneto-optic film may have a silicon nitride backing on aluminum. As with more conventional systems, a good example of a suitable magneto-optic material would be TbFeCo.

The optical head includes a focusing lens 22 which focuses light 23 into a stylus, to be presently described, carried by a read/write assembly head 24. The stylus comprises a pair of crossed tapered silicon nitride prisms having a slit in the tip of the prism. The length of the slit is greater than one-half wavelength in the material filling the prism; however, the width can be much smaller.

Light from a laser 26 or other source is directed to optical disks by beam splitter 25 where it illuminates the optical disk through the objective lens recording head combination. During writing the laser may be directly or externally modulated by a modulator 27 to write magnetic domains on the recording disk. Operation of a rotatable half wave plate 28 and rotatable or removable polarizer 29 will be presently described. In the write mode the light impinging on a spot on the disk 21 is of sufficient intensity to raise the temperature of the spot above the Curie temperature. This permits the recording of a magnetic domain in response to an applied magnetic field. In the read mode, light from the laser 26 reflected by the magnetic domains in the optical disk travels through beam splitter 25 and half wave plate 31 to a polarizing beam splitter 32 and thence to detectors 33 and 34. Operation of the system to read and write information onto the magneto-optical disk will be presently described.

A read/write head employing a stylus in accordance with the present invention is shown in FIGS. 2, 3 and 4. Fabrication of a stylus for a read/write head will be presently described. The head includes a stylus 41 comprising a pair of crossed rectangular prisms 42 and 43. The prisms are formed of silicon nitride or other high index of refraction material such as $ZrO_2$ or diamond. The prisms are supported on a silicon nitride support layer 44 and extend downwardly therefrom. The surface of the prisms 42 and 43 is provided with an opaque metal film which extends to the tip of the prisms. The tips of the prisms include elongated slits as described above. FIG. 4 is a top view of the prisms showing crossed slits 48 and 49. The light beam 23 is shown impinging on the top surface of the prisms. A silicon support frame 51 is formed on top of the support layer 44 and a silicon pad 52 is formed on the bottom of the layer and serves to interact with the rotating disk to "float" the head. In the embodiment shown in FIG. 2 a solid immersion lens 56 is placed in contact with the flat surface of the prisms 42 and 43.

As previously described, the prisms taper to a slit whose length is greater than one-half the wavelength of light in the prism material filling and the width can be much smaller. As is well known, the slit width can be small without cutting off E-fields if the length of the slit is greater than one-half wavelength of the light in the prism material. The incident light beam 23 excites a $TE_{10}$ mode on the vertical prism 42 with its long axis in the y direction and its principal E-field 53 in the x direction. The second prism 43 with its long axis in the x direction supports a $TE_{10}$ mode with its principal E-field 54 in the y direction. The second prism is used for reading and along with the first prism for writing.

A recorded domain or spot on the magneto-optical disk rotates the polarization of a reflected light wave field so that the rotated $E_y$ component of the field can be detected through the second slit with its long axis in the x direction. Furthermore the slit in the xdirection can be used for tracking and location by detecting the directly reflected field components.

When information is to be stored or written onto the magneto-optic material, both prisms are illuminated so that the near fields at the crossing of the slits at the ends of the prisms are of sufficient intensity to raise the temperature of the magneto-optic material at the crossing above the Curie temperature. This can be done by either rotating the polarizer 29 in front of the light source laser 26 or by inserting a half wave plate 28 with its principal axis at 45° with respect to the input polarization of the laser so that the polarization is rotated 45° and both slits are equally excited. If the laser is unpolarized, then removing the polarizing quarter wave plate would do just as well. The input power from the laser must be carefully controlled so that the beam through one slit alone does not provide evanescent (near) fields having sufficient intensity to heat the magneto-optic material to its Curie point. However, the light at the crossover regions (the spot) has double the intensity and raises the temperature above the Curie point. The applied magnetic field will then form a well-defined magnetic domain. It is clear that the crossover area may be a fraction of a wavelength in area because the width of the slits can be made small without cutting off light transmission. Data is recorded by modulating the laser itself or by modulator 27 as the disk rotates.

The head 24 may be a floating head which maintains the distance of the head above the recording medium. Servo systems for positioning the objective lens 22 and head 24 with respect to the disk 21 are well-known and are not described herein.

In order to read recorded data stored as magnetic domains, the polarizer 29 is rotated to provide polarized light which excites the cross track waveguide 43, FIG. 4, to provide E-fields 54 in the track direction. A magnetic domain on the magneto-optical disk rotates the plane of polarization of a reflected wave. The E-fields 53 in the cross track direction are picked up by the vertical slit 48. Furthermore, the horizontal slit can detect directly reflected light components for tracking and locating the recording head. The definition of the system for recording and reading is dictated by the area of the cross over of the two slits 48, 49. Their lengths should be kept as small as possible, for the sensitivity depends on the ratio of this area to the area of the slit. That is, if (a) in FIGS. 3 and 4 is the length of a slit and (b) is its width, its sensitivity is reduced by approximately (b)/(a) or more exactly $0.5b/a+[\sin(\pi b/a]/\pi$ since the variation in field along the length of the slits is sinusoidal.

In the receiving mode the receiving slit is aligned to receive the rotated polarized light. The light travels back through the objective lens 22 and through the beam splitter 25. If the directly reflected signal is of amplitude A and the rotated component of amplitude B, by using a half wave plate 31 followed by a polarizing beam splitter 32, signals are provided to detectors 32 and 34. The value of the signals are $(A+B)^2$ and $(A-B)^2$. The difference of these signals is proportional to 2AB and thus proportional to the amplitude of the rotated component. Since $A^2>>B^2$, the sum of the two signals would be essentially $A^2$. One of the detectors can have two or more phototransducers and can be used for tracking.

For the stylus we propose to use prisms with a very rapid taper. An example of a prism having a high refractive index is a silicon nitride prism with a very rapid taper angle of 36° and a refractive index of 2.1. The prism is excited by a focused beam, which ideally would be focused on the tip. In the ideal case a semiconductor laser emits a conically-shaped focused beam 23, FIG. 2, through an objective lens 22 and a small solid immersion lens 56, which is focused onto the tapered silicon nitride prism tip. The lower end of the prism near its tip or the whole prism is covered with metal, except for a thin slit or rectangular hole at its end. The prism is metallized to minimize the optical leakage from its side walls, although this may not be necessary where the prism is relatively wide, and where the metal may be omitted to minimize conduction cosses. The prism can be made part of a flying head so that it floats on the rotating disk. The half angle θ subtended by the beam is made approximately equal to the taper angle of the slit, and the beam is made slightly smaller than the top of the prism so that the beam does not impinge on the walls of the prism, until its width decreases no further. Beyond that point the mechanical confinement of the beam, rather than focusing, reduces the beam still further in size.

It is simpler in many cases to omit the solid immersion lens, as shown in FIG. 2. Instead of using the solid immersion lens, we find that because the taper length is of the order of 2–4 $\mu$m, it is possible to live with the aberrations produced by using imperfect focusing into the plane surface at the top of the prism because any phase differences that occur over a short length are relatively small. Referring to FIGS. 5 and 6 we show a solid prism 60 of length $z_0$ and refractive index on with a flat top surface 61. When a lens 22 is used to focus the beam in air to a distance z below the top surface, the rays are refracted so that the paraxial focus is at a distance z' below the top surface. With the prism comprising a material of high refractive index, such as silicon nitride with a refractive index 2.2, it follows from Snell's law that the incident angle for rays in the medium of angle θ' is θ=arcsin (n sin θ'). The maximum angle θ' for on=2.2 is about 27°. It is apparent that with a finite aperture beam we cannot obtain a beam with a maximum half-angle 3° needed to fill the guide.

By using an overlap integral, we have calculated for finite aperture incident beams the position of the best focus, z, for optimum excitation efficiency of the principal mode of a square shaped prism of angle 36°. As shown in FIGS. 6 and 7, we have calculated that having a numerical aperture NA=0.8, we get 73% efficiency for excitation of the principal tapered waveguide mode, while with a lens having NA=0.65, we get an efficiency of 55%. With a solid immersion lens (SIL) of the same refractive index as the prism, the efficiency would be about 83%, assuming perfect contact with the SIL.

As we have seen, the prism comprises silicon nitride to decrease the effective wavelength by a factor of 2.2 (the refractive index of low stress silicon nitride). This enables us to decrease all dimensions by a factor of 2.2, and use a solid immersion lens with the same refractive index (ZnS or $ZrO_2$) for focusing to obtain the smallest possible spot and minimize optical losses. Alternatively, as shown in FIG. 9, we can use a Fresnel lens 57 for focusing and form this lens on the top surface of the probe. The latter procedure allows much easier alignment, and a very light weight structure which can be excited by a rectilinear beam and easily scanned across the tracks of an optical disk. Its disadvantage will be a decrease in optical efficiency. The efficiency would now be approximately 82% times the Fresnel lens efficiency. Since the maximum efficiency of a two phase Fresnel lens is 40%, the total efficiency for excitation of the $TE_{10}$ mode, assuming perfect phase matching, will be of the order of 30%.

Crossed rectangular tapered silicon nitride prisms for a stylus in accordance with the present invention can be fabricated by silicon processing techniques. Referring to FIGS. 10A through 10J, the steps in forming a stylus with a Fresnel lens are schematically illustrated. For simplicity the method is shown for the formation of a single prism rather than crossed prisms. With a change in the masking steps crossed prisms can be easily formed.

A substrate of silicon 62 is covered with photoresist 63. A window 64 is formed in the photoresist and the wafer is anisotropically etched (FIGS. 10A, 10B and 10C) to form wells having pyramidally-shaped <111>faces 65. The photoresist is removed and silicon nitride 66 is deposited on the silicon and inside the well, to fill the well and form a pyramidally-shaped probe, FIG. 10D, about 4 $\mu$m long. The top surface of the silicon is covered with an uneven layer of SiN (FIG. 10D) and is then lapped to form a flat SiN surface layer 1–2 $\mu$m thick on the silicon (FIG. 10E).

Silicon dioxide 67 is subsequently deposited on top of the SiN to a thickness of about 0.1 $\mu$m (FIG. 10F). A Fresnel lens 68 is formed in the silicon dioxide $SiO_2$ layer by E-beam lithography. The lens focuses light into the tip 69(FIG. 10G). In other cases a refractive lens or Fresnel lens is mounted separately and focused on the probe as shown in FIGS. 5 and 6. A Si wafer 71, with holes much larger than the size of the Fresnel lens, is bonded to the $SiO_2$ layer (FIG. 10H). The purpose of this additional silicon layer is to provide a strong substrate for mounting the stylus.

The silicon wafer 62 (former substrate) is removed by etching alone or by lapping (FIG. 10I) and the SiN prism 72 is covered by an opaque material 73, for example aluminum or polysilicon with a thickness comparable to or larger than its optical skin depth. Typically, aluminum would be used with a thickness of the order of 15 nm. An aperture is opened in the layer at the tip using either method described in R. C. Davis, C. C. Williams and P. Neuzil, "Micromachined Submicrometer Photodiode for Scanning Probe Microscopy", *Applied Physics Letters*, vol. 66 (18), pp. 2309–2311, May 1995, or alternative methods such as a focused ion beam.

FIG. 11 shows a stylus 76 formed in accordance with the above mounted on flexible cantilever 77 at the end of an arm 78. This relatively light weight assembly can be used to provide rapid access to write or read information on the disk.

Thus there has been provided an improved read/write head assembly which includes a stylus having crossed rectangular tapered prisms and a method of forming crossed rectangular tapered prisms.

What is claimed is:

1. In a magneto-optic recording system:
   a read/write head assembly for reading or writing information on an adjacent magnetic recording medium, said read/write head assembly including a stylus comprising crossed tapered rectangular prisms of a material having a high index of refraction,
   an opaque layer covering the sides and ends of said prisms, and
   a slit opening at the end of the prisms having a length greater than one-half the wavelength of light in the prism media and a width substantially less than the wavelength of light in the prisms.

2. A read/write head assembly for reading/writing information in a magnetic storage medium, including:
   a stylus comprising a pair of crossed, substantially rectangular prisms of material having a high index of refraction,
   an opaque layer covering the sides and ends of said prisms,
   a slit opening at the end of said prisms having a length which is greater than one-half wavelength of the light being transmitted in the prism medium and a width substantially less than wavelength of light in the medium, and
   a source of light for directing light of predetermined wavelength into at least one of said prisms to provide E-fields extending outwardly from said slit, and means for positioning of said slit adjacent to the magnetic storage medium so that the E-fields are coupled to said magnetic storage medium.

3. A read/write head assembly as in claim 2 in which the other prism receives reflected light which has been rotated by magnetic fields in said recording medium.

4. A read/write head assembly as in claim 2 in which the source of light projects light into both of said prisms, said light having an intensity which is not sufficient to heat the magnetic medium above Curie temperature at either slit, but which is sufficient to heat the magnetic medium above the Curie point when summed at the crossing of the slits.

5. A read/write head assembly as in claim 2, 3 or 4 in which the prisms are formed of high refractive index material.

6. A read/write assembly for reading/writing information in a magnetic media, including:

- a read/write head having a stylus comprising a pair of crossed, substantially rectangular prisms formed of material having a high index of refraction each of which tapers at a predetermined angle, an opaque layer covering the sides and ends of said prisms, a slit opening at the end of said prisms having a length which is greater than one-half wavelength of the light being transmitted in the prism medium and a width substantially less than the wavelength of the light transmitted in the medium,
- a source of light of predetermined wavelength,
- lens means for receiving light from the source of light and forming and directing a tapered light beam into at least one of said prisms to provide E-fields extending outwardly from the slit in said prism, and
- means for positioning said head adjacent to the magnetic storage medium so that the E-fields at the slit are coupled to said magnetic storage medium.

7. A read/write assembly as in claim 6 in which said crossed prisms are formed of silicon nitride.

8. A read/write assembly as in claim 6 in which the beam tapers at an angle equal to or less than the taper angle of the prism.

9. A read/write assembly as in claim 6 in which the lens means includes an objective lens and a solid immersion lens contacting the upper surface of the prisms.

10. A read/write assembly as in claims 8 or 9 in which the tapered beam is smaller than the prism so that the beam does not impinge on the sides of the prism until the dimension of the beam cannot further decrease because of diffraction.

11. A read/write optical assembly as in claim 6, 7, 8 or 9 in which one prism receives reflected light which has been rotated by magnetic fields in said recording medium.

12. A read/write head assembly as in claim 6 in which the source of light projects light into both of said prisms, said light having an intensity which is not sufficient to heat the magnetic medium above Curie temperature at either slit but which is sufficient to heat the magnetic medium above the Curie point where the slits cross.

13. The method of forming a stylus comprising a pair of crossed prisms which comprises the steps of etching crossed wells having pyramidal shaped walls in a substrate, filling the wells with high refractive index material and thereafter removing the substrate to leave the crossed prisms.

14. The method as in claim 14 in which the faces of the prisms are coated with a thin film and slits are formed at the tips of the prisms.

* * * * *